United States Patent Office 2,851,399
Patented Sept. 9, 1958

2,851,399
STABILIZED PLATINUM-ALUMINA CATALYSTS CONTAINING SELENIUM

Harry M. Brennan, Hammond, Ind., and Edmund Field, Chicago, Ill., assignors to Standard Oil Company, Chicago, Ill., a corporation of Indiana No Drawing. Application June 29, 1955
Serial No. 518,926

16 Claims. (Cl. 196—50)

This invention relates to the conversion of hydrocarbons. More particularly, it relates to the hydroforming of petroleum naphthas over alumina-supported platinum catalysts, and to stabilized catalysts for such processes.

The treatment of petroleum hydrocarbons for various purposes is now largely carried out by catalytic means. One large-scale development in this field in recent years has been the hydroforming of petroleum naphthas over alumina-supported platinum catalysts to prepare gasolines of greatly improved antiknock rating. The use of expensive platinum for this purpose has proved to be commercially feasible only because the combination thereof with alumina permits the platinum to be employed in very low concentrations, about 0.05 to 1 percent by weight, based on the alumina. Care must still be taken to avoid charging stocks and operating conditions and procedures which might tend to deactivate the catalyst. For example, it is desirable to operate the hydroforming process under comparatively low pressure conditions (i. e., below about 350 pounds per square inch gage) in order to achieve the highest possible yields and octane levels; but under such conditions, carbon deposition and catalyst deactivation are comparatively rapid. Moreover, when petroleum naphthas are subjected to catalytic hydrogenation to remove sulfur and other impurities, the treated naphthas have unexpectedly been found to cause extremely rapid catalyst deactivation, especially under low-pressure hydroforming conditions. An object of our invention is to provide a method and means for preventing such rapid catalyst deactivation. Other objects will be apparent from the present description and the operating examples.

We have now found that platinum-alumina catalysts can be greatly improved in stability by incorporating selenium or a selenium-containing substance therein, as will be described more fully hereinafter.

In one aspect, our invention is a platinum-alumina catalyst containing selenium, a selenium compound, or other selenium-containing substance in a quantity equivalent to between about 0.01 and 1 atom of selenium per atom of platinum contained in the catalyst, preferably between about 0.05 and 0.5. Such catalysts are superior in stability, especially under adverse conditions which seriously impair the activity of prior-art catalysts.

Suitable additives include selenium, hydrogen selenide, selenium dioxide, selenium trioxide, selenium halides (especially the chlorides and fluorides), selenic and selenious acids and salts and esters thereof, such as ammonium selenate, potassium selenite, dibutyl selenate, diethyl selenite, and the like, and organo-selenium compounds, such as dibutyl selenide, diethyl selenide, and the like. The selenate and selenite salts should preferably be free from detrimental cations (e. g., sodium), or such cations should be removed from the completed catalyst by methods known to the art. Acceptable cations include ammonium and substituted ammoniums (i. e., amines). We prefer to use ammonium selenide, selenium dioxide, or free selenic or selenious acid; these materials are effective stabilizers, they are comparatively easy to handle, and they avoid the hazards involved in the use of volatile, highly toxic substances such as hydrogen selenide.

In another aspect of our invention, a platinum-alumina composite is exposed to contact with a selenium-containing substance in a sufficient quantity to incorporate a stabilizing quantity of selenium therein, as defined above. This technique is effective broadly for the treatment of the prior-art platinum-alumina catalysts.

The stabilization of catalysts with selenium in accordance with our invention can be carried out in a variety of ways.

According to one technique, a platinum-alumina composite, prepared by any of the methods known in the art, can be impregnated with a selenium-containing solution. The composite should thereafter be dried at 200 to 600° F. for 6 to 24 hours, then calcined at 800 to 1200° F. for 1 to 24 hours. Aqueous solutions are generally preferred for economic reasons, although organic or aqueous-organic solutions may also be employed, especially in connection with difficultly soluble selenium compounds. The inclusion of an organic solvent may also improve the penetration of the treating solution into the catalyst particles, e. g., where the particles contain a lipophilic material as a pelleting lubricant. A wide variety of organic solvents may be employed, as required to dissolve the treating substance or to penetrate the platinum-alumina particles, including methanol, ethanol, acetone, ethyl ether, benzene, carbon tetrachloride, carbon disulfide, ethylene glycol, dioxane, furfuryl alcohol, and the like. Colloidal solutions or suspensions of the treating substance may also be employed. The concentration of treating agent in the treating solution is not critical, and may range, for example, from about 0.1 to 10 weight percent or more. As a matter of convenience, we prefer to employ a volume of solution just sufficient to saturate the alumina particles, and to adjust the concentration of treating agent therein so that such volume will incorporate the desired quantity of treating agent in the completed catalyst.

In another technique, a completed platinum-alumina catalyst of the prior-art type may be exposed to contact with a vapor stream containing a treating agent of our defined class under suitable conditions of temperature, pressure, gas velocity, and selenium concentration to deposit a stabilizing proportion of selenium in the catalyst, as set forth above. Such treatment may suitably be carried out at ordinary or elevated temperatures, so long as an effective concentration of selenium additive can be maintained in the gas stream. Hydrogen selenides, for example, can be diluted with nitrogen, hydrogen, flue gas, or the like to a concentration around 0.1 to 1 percent and employed at ordinary temperatures or elevated temperatures up to about 1200° F., preferably around 800 to 1000° F. Selenium dioxide sublimes around 600° F., and can be picked up and carried in a stream of air, oxygen, or inert gas at or above this temperature. In any given case, the conditions of temperature, pressure, and concentration of treating agent should be adjusted to permit penetration of the treating vapors into the catalyst particles and to minimize selective deposition of selenium or selenium compounds on the outer surfaces of the catalyst.

In another aspect of our invention, the selenium treating agent may be added to alumina before, in combination with, or immediately following the platinum solution or colloid. Thus, a selenium compound can be added to a platinum solution before the latter is mixed with the alumina, or the two substances may be added separately, the platinum being preferably added first, and the alumina preferably being solid, hydrous alumina. The platinum solution or colloid may include hydrogen sulfide, ammonium sulfide, or other sulfiding agent, as described in the art. The completed composite should be dried and calcined as set forth above.

In another aspect, our invention may be employed for the treatment of a used platinum-alumina catalyst, suitably after carbon has been burned therefrom with a dilute oxygen stream at a temperature between about 825 and 1200° F., and optionally after a further exposure of the catalyst to an oxygen partial pressure above about 0.4 atmosphere and at a temperature between about 950 and 1200° F. By means of this procedure, the catalyst is both reactivated and stabilized. Vaporphase treatment, as outlined above, is especially well adapted to this embodiment of our invention, and the treatment can conveniently be carried out by addition of selenium-containing vapors to the gas stream during carbon burn-off and/or further exposure of the catalyst to oxygen.

In another aspect, our invention is a hydrocarbon-conversion process, such as a naphtha hydroforming process, employing a selenium-stabilized platinum-alumina catalyst of the new type described herein. Our invention is especially advantageous in the hydroforming of low-sulfur naphthas under low-pressure hydroforming conditions, C, in the i. e., naphthas affording a sulfur concentration, C, in the hydroforming zone less than about 350−P, where C is expressed in parts per million based on the naphtha, and where P is the hydroforming pressure below about 350 pounds per square inch gage and above about 10 pounds per square inch gage. Our selenium-stabilized catalyst can be used to treat such stocks under such conditions with markedly decreased coking and deactivation rates.

An excellent catalyst of the prior-art type can be prepared according to the procedure described by Heard et al. in U. S. Patent 2,659,701 (November 17, 1953). Heard et al. preferably start with an alumina hydrosol of the type described by Heard in Re. 22,196 (October 6, 1942), obtained by digesting amalgamated aluminum in dilute aqueous acetic acid solution. The platinum is combined therewith in the form of an aqueous chloroplatinic acid solution to which has been added a sufficient quantity of an ammonium sulfide to convert the platinum into a stable sol or solution. The platinum solution is added to the hydrosol in an amount sufficient to incorporate between about 0.05 and 1 percent by weight of platinum therein, based on dry $Al_2O_3$. The resulting mixture is agitated and adjusted to a pH of around 6 to 7 with aqueous 10 percent ammonium hydroxide, as a result of which the entire mass sets to a vibrant ultragel. The gel is dried in air at around 220° F. to a volatiles content of 35 to 50 percent, wet basis, and is further dried in air at 900° F. for around 20 hours to a volatiles content of around 10 percent. The dried cake is ground to pass 30 mesh, lubricated with 4 percent of Sterotex, formed into shapes as desired (suitably ⅛" x ⅛" cylindrical pellets), and calcined in air at 1100° F. for around 6 hours. Such catalysts ordinarily have an activity of 60, measured against an arbitrarily chosen standard catalyst having an assigned activity of 100.

Other suitable prior-art catalysts are described, for example, in Haensel U. S. Patent 2,479,109 (August 16, 1949), Ciapetta U. S. Patent 2,550,531 (April 24, 1951), and Guyer et al. U. S. Patent 2,667,461 (January 26, 1954).

An especially suitable catalyst for stabilization according to our invention is platinum supported on an alumina prepared by alkali-aging an alumina hydrosol to produce a filterable alumina slurry, separating the alumina, drying to a volatiles content below about 50 percent, wet basis, impregnating with a platinum solution, drying, and calcining. The hydrosol may be prepared by any of the various techniques disclosed in the art, preferably according to the method of Heard, described in Re. 22,196 (October 6, 1942), in which amalgamated aluminum is digested in dilute aqueous acetic acid solution. The hydrosol is adjusted to a pH between about 8.5 and 12 with a water-soluble amine, a mild inorganic alkali, or preferably ammonia or ammonium hydroxide, and the mixture is aged with occasional agitation for 1 to 48 hours or more at about 50 to 250° F., preferably at ordinary temperatures around 70 to 100° F. for about 6 to 24 hours. During this time, white, finely divided hydrous alumina forms in the liquid phase as a filterable slurry, the reaction being ordinarily complete in as little as 1 hour at pH 9.5 or above, whereas a day may be required at pH 9, and 2 to 3 days at pH 8.5. The slurry thus obtained is filtered to separate the hydrous alumina, suitably at an elevated temperature between about 150 and 200° F. in order to insure a rapid filtration rate. The filter cake is then dried at a temperature which may range up to about 1200° F., preferably between about 150 and 400° F., to a volatiles content less than about 50 percent, wet basis, preferably between about 15 and 40 percent. The dried cake is thereafter impregnated with a platinum-containing solution according to any of the techniques of the prior-art, such as those referred to above, to a platinum level between about 0.05 and 1 percent by weight, based on dry $Al_2O_3$. For this purpose, it is especially advantageous to employ a platinum suspension prepared by adding an ammonium sulfide to an aqueous chloroplatinic acid solution, as described by Heard et al. in U. S. Patent 2,659,701. The impregnated alumina is again dried, pelleted if desired, and finally calcined in air, hydrogen, or an inert gas such as nitrogen or flue gas at 800 to 1200° F., preferably 1000 to 1200° F., around 3 to 24 hours before being placed on stream in a catalytic process.

In one embodiment of the foregoing method, the alumina hydrosol is subjected to extended aging for 60 hours or more, preferably around 75 to 150 hours. The alumina obtained thereby, after being dried and calcined, exhibits two maxima in the curve of pore volume plotted against pore diameter, and is especially advantageous as a supporting material for platinum catalysts.

The following specific examples will more fully illustrate our invention:

*Example 1*

An alumina catalyst support was prepared according to the following procedure. Into a ceramic vessel were charged 270 pounds of an alumina hydrosol containing 5.13 percent $Al_2O_3$, prepared by digesting amalgamated aluminum in dilute aqueous acetic acid, as described in Heard Reissue 22,196 (October 6, 1942). The hydrosol was agitated and adjusted to pH 10.5 by addition of concentrated aqueous ammonium hydroxide solution, and the alkalized sol was allowed to stand with occasional stirring for 20 hours at room temperature. During this time, a filterable slurry of hydrous alumina formed and settled to the bottom of the reaction vessel. At the end of the aging period, the slurry was filtered, and the solids were washed substantially free of ammonia with distilled water. The washed solids were then dried at 220° F. for 16 hours to a water content of 35 percent by weight, wet basis. The dried cake was crushed to pass 30 mesh. The resulting powder will be referred to hereinafter as "AAS alumina."

A 1,450-gram portion of AAS alumina, described above, was impregnated with 1 liter of aqueous chloroplatinic acid solution, equivalent to 5.5 grams of platinum. The impregnated powder was dried 17 hours at 220° F., crushed to pass 30 mesh, lubricated with 4 percent of Sterotex, formed into ⅛" x ⅛" pellets, and calcined in air at 1000° F. for 6 hours. The completed composition contained 0.6 percent by weight of platinum, based on dry $Al_2O_3$, and will be referred to hereinafter as "0.6 percent platinum on AAS alumina."

A 100-gram portion of 0.6 percent platinum on AAS alumina, prepared as described above, was impregnated with 100 milliliters of aqueous 0.27 percent ammonium selenide solution, and the impregnated catalyst was dried at 200° F. for 17 hours and calcined at 1000° F. for 6 hours.

The completed catalyst containing 0.09 weight percent of selenium, was subjected to a virgin naphtha hydroforming test under standardized conditions, employing 50 milliliters of catalyst in a quasi-isothermal reaction zone surrounded by an electrically heated block for temperature control. The test was carried out at a catalyst outlet temperature of 920° F., a pressure of 200 pounds per square inch gage, an hourly weight space velocity of 2, and a once-through hydrogen rate of 5,000 standard cubic feet per barrel of feed. The feed was a Mid-Continent virgin naphtha having an ASTM distillation range of 210 to 356° F., a CFR-R octane number of 44.0, an API gravity of 55.2°, a Reid vapor pressure of 1.1 pounds per square inch, and a content of 50 percent by volume of paraffins, a trace of olefins, 41.5 percent naphthenes, 8.5 percent aromatics, 0.028 percent sulfur, and 0.01 percent nitrogen (Kjeldahl). The results were adjusted to an average catalyst temperature of 900° F., and the catalyst activity was calculated as the relative quantity, expressed as a percentage, of an arbitrarily chosen standard catalyst required to produce a $C_{5+}$ product fraction having the same octane number under the same test conditions. The results were as follows:

| Product Interval, hours | Octane No., CFR-R | Relative Activity |
| --- | --- | --- |
| 0-20 | 98.5 | 151 |
| 20-40 | 97.3 | 122 |
| 40-60 | 98.2 | 141 |
| 60-80 | 97.1 | 118 |
| 80-100 | 97.1 | 117 |
| 100-120 | 97.1 | 117 |

For comparison, another selenium-stabilized 0.6 percent Pt—$Al_2O_3$ catalyst, prepared according to the procedure and under the conditions described above, was tested under the same conditions in the hydroforming of a hydrofined Mid-Continent naphtha having an ASTM distillation range of 198 to 364° F., a CFR-R octane number of 44.5, an API gravity of 55.6°, an index of refraction ($n_D^{20}$) of 1.4212, a bromine number of 1.24, an $H_2S$ number of 0, a mercaptan number of 0.64, and a content of 44 percent by volume of paraffins, a trace of olefins, 48 percent naphthenes, 8 percent aromatics, 6 parts per million of sulfur (turbidimetric), 34 parts per million of water, 0.6 part per million of chloride, 1.39 parts per million of peroxide, and between about 2 and 3 parts per million of nitrogen. The catalyst activity was calculated as the relative quantity, expressed as a percentage, of the arbitrarily chosen standard catalyst required to produce a $C_{5+}$ product fraction having the same octane number from the Mid-Continent virgin naphtha, described above, under the same test conditions. The results were as follows:

| Product Interval, hours | Octane No., CFR-R | Relative Activity |
| --- | --- | --- |
| 0-20 | 99.3 | 166 |
| 20-40 | 99.6 | 169 |
| 40-60 | 98.5 | 149 |
| 60-80 | 98.6 | 152 |
| 80-100 | 99.3 | 165 |
| 100-120 | 98.2 | 144 |

Thus, the selenium-containing catalyst proved to be remarkably stable in the treatment of the hydrofined feed. This is in striking contrast to the behavior of an unstabilized catalyst, as exemplified by the 0.6 percent platinum on AAS alumina, described above. The following are the results of a test on such a catalyst in the hydroforming of the hydrofined charging stock:

| Product Interval, hours | Octane No., CFR-R | Relative Activity |
| --- | --- | --- |
| 0-20 | 98.0 | 137 |
| 20-40 | 95.2 | 85 |
| 40-60 | 94.4 | 75 |
| 60-80 | 93.4 | 67 |
| 80-100 | 93.1 | 65 |
| 100-120 | 91.8 | 57 |

*Example 2*

Another selenium-stabilized catalyst was prepared by impregnating a 0.6 percent platinum on AAS alumina catalyst, described in Example 1, with an ammoniacal selenium dioxide solution in a quantity equivalent to 0.1 percent by weight of Se, based on dry $Al_2O_3$. The ammoniacal selenium dioxide solution was prepared by dissolving 0.2 gram of $SeO_2$ in 100 milliliters of aqueous 1 percent $NH_3$ solution. The impregnated catalyst was dried at 200° F. for 17 hours, calcined at 1000° F. for 6 hours, and subjected to a standard hydroforming test on hydrofined Mid-Continent naphtha, as described in Example 1. The results were as follows:

| Product Interval, hours | Octane No., CFR-R | Relative Activity |
| --- | --- | --- |
| 0-20 | 95.0 | 82 |
| 20-40 | 96.8 | 111 |
| 40-60 | 97.2 | 119 |
| 60-80 | 97.2 | 120 |
| 80-100 | 97.7 | 124 |
| 100-120 | 97.3 | 116 |

*Example 3*

In the following test, a colloidal selenium solution was employed to stabilize a 0.6 percent platinum on AAS alumina catalyst, prepared as described in Example 1. The colloidal selenium solution was prepared by dissolving 0.36 gram of $SeO_2$ in 100 milliliters of water, then reducing to free selenium by adding 4 milliliters of aqueous 23 percent ammonium sulfide solution. A sufficient quantity of the colloidal selenium solution was incorporated in the platinum-alumina catalyst to add 0.2 percent by weight of selenium thereto, based on dry $Al_2O_3$. The impregnated catalyst was dried at 200° F. for 17 hours, calcined at 1000° F. for 6 hours, and subjected to a standard hydroforming test on hydrofined Mid-Continent naphtha, as described in Example 1. The results were as follows:

| Product Interval, hours | Octane No., CFR-R | Relative Activity |
| --- | --- | --- |
| 0-20 | 93.7 | 69 |
| 20-40 | 95.8 | 93 |
| 40-60 | 96.8 | 112 |
| 60-80 | 97.2 | 120 |

The foregoing data reveal a continuing rise in catalyst activity during the first 80 hours on stream. This may indicate that the selenium had been employed in a proportion greater than the optimum, and that the catalyst was approaching its maximum activity through depletion or deactivation of the selenium.

*Example 4*

AAS alumina (prepared as described in Example 1) weighing 200 grams and containing 125 grams of $Al_2O_3$ was coimpregnated to a level of 0.6 percent platinum and 0.0685 percent selenium with an aqueous solution of chloroplatinic acid and ammonium selenide. The impregnated alumina was dried at 250° F. for 17 hours, formed into ⅛″ x ⅛″ cylindrical pellets, calcined at 1000° F. for 6 hours, and subjected to a standard hydroforming test on hydrofined Mid-Continent naphtha, as described in Example 1. The results were as follows:

| Product Interval, hours | Octane No., CFR-R | Relative Activity |
|---|---|---|
| 0-20 | 96.6 | 108 |
| 20-40 | 96.1 | 98 |
| 40-60 | 96.7 | 109 |
| 60-80 | 96.1 | 99 |
| 80-100 | 96.1 | 98 |
| 100-120 | 95.6 | 92 |

*Example 5*

AAS alumina (prepared as described in Example 1) weighing 200 grams and containing 125 grams of $Al_2O_3$ was coimpregnated to a level of 0.6 percent platinum and 0.114 percent selenium, based on dry $Al_2O_3$, with an aqueous solution of chloroplatinic acid and selenium dioxide, prepared by dissolving 1.85 grams of $$H_2PtCl_6 \cdot xH_2O$$

(40 percent Pt) and 0.2 gram of $SeO_2$ in water to a total solution volume of 170 milliliters. The entire volume of solution was employed, and the alumina was saturated thereby. The impregnated alumina was formed into 1/8" x 1/8" cylindrical pellets, dried at 220° F. for 17 hours, calcined at 1000° F. for 6 hours, and subjected to a standard hydroforming test on hydrofined Mid-Continent naphtha, as described in Example 1. The results were as follows:

| Product Interval, hours | Octane No., CFR-R | Relative Activity |
|---|---|---|
| 0-20 | 97.7 | 133 |
| 20-40 | 98.7 | 157 |
| 40-60 | 98.6 | 155 |
| 60-80 | 97.0 | 115 |
| 80-100 | 97.3 | 121 |
| 100-120 | 97.6 | 129 |

*Example 6*

AAS alumina was prepared as described in Example 1, with the exception that the ammonia-aging of the alumina hydrosol was carried out for an extended period of 4 days. The resulting material will be referred to hereinafter as "SAS alumina."

SAS alumina weighing 2,089 grams was impregnated with 1,300 milliliters of an aqueous solution containing chloroplatinic acid in a quantity sufficient to incorporate 0.6 percent by weight of platinum therein, based on dry $Al_2O_3$. The impregnated powder was dried at 500° F. for 17 hours, formed into 1/8" x 1/8" cylindrical pellets, and calcined at 1000° F. for 6 hours. The resulting composite will be referred to hereinafter as "0.6 percent platinum on SAS alumina."

A portion of the 0.6 percent platinum on SAS alumina pellets was impregnated with an aqueous alkaline selenium dioxide solution in a quantity equivalent to 0.1 percent by weight of Se, based on dry $Al_2O_3$. The selenium dioxide solution was prepared by mixing 7 milliliters of aqueous 30 percent $NH_3$ solution, 93 milliliters of water, and 20 milliliters of aqueous $SeO_2$ solution containing 0.1 gram of Se per 100 milliliters. The impregnated catalyst was dried at 400° F. for 17 hours, calcined at 1000° F. for 6 hours, and subjected to a standard hydroforming test on hydrofined Mid-Continent naphtha, as described in Example 1. The results were as follows:

| Product Interval, hours | Octane No., CFR-R [1] | Relative Activity |
|---|---|---|
| 0-20 | 98.5 | 151 |
| 20-40 | 98.6 | 155 |
| 40-60 | 98.4 | 146 |
| 60-80 | 98.2 | 140 |
| 80-100 | 97.8 | 127 |
| 100-120 | 97.6 | 121 |

[1] Adjusted to an average catalyst temperature of 903° F.

For comparison, a similar hydroforming test on a hydrofined Mid-Continent naphtha was carried out on an aliquot of the 0.6 percent platinum on SAS alumina which had not been treated with selenium dioxide. The results were as follows:

| Product Interval, hours | Octane No., CFR-R | Relative Activity |
|---|---|---|
| 0-20 | 99.0 | 184 |
| 20-40 | 98.6 | 139 |
| 40-60 | 97.9 | 118 |
| 60-80 | 96.5 | 105 |
| 80-100 | 96.0 | 96 |
| 100-120 | 95.6 | 90 |

For further comparison, another aliquot of the original (untreated) 0.6 percent platinum on SAS alumina was subjected to a hydroforming test on Mid-Continent virgin naphtha. The results were as follows:

| Product Interval, hours | Octane No., CFR-R | Relative Activity |
|---|---|---|
| 0-20 | 99.9 | 186 |
| 20-40 | 97.6 | 130 |
| 40-60 | 97.0 | 115 |
| 60-80 | 97.0 | 115 |
| 80-100 | 96.0 | 96 |
| 100-120 | 96.3 | 102 |

*Example 7*

SAS alumina base (prepared as described in Example 6) weighing 200 grams and containing 125 grams of $Al_2O_3$ was coimpregnated to a 0.6 percent by weight platinum level and to a 0.05 percent selenium level, based on dry $Al_2O_3$, by saturating the alumina with an aqueous solution of chloroplatinic acid and selenium dioxide. The said solution was prepared by mixing 200 milliliters of aqueous solution containing 1.85 grams of $H_2PtCl_6 \cdot xH_2O$ (40 percent Pt) with 15.6 milliliters of aqueous solution containing $SeO_2$ equivalent to 4 grams of Se per liter. The impregnated alumina was dried at 220° F. for 17 hours, formed into 1/8" x 1/8" cylindrical pellets, calcined at 1000° F. for 6 hours, and subjected to a standard hydroforming test on hydrofined Mid-Continent naphtha, as described in Example 1. The results were as follows:

| Product Interval, hours | Octane No., CFR-R | Relative Activity |
|---|---|---|
| 0-20 | 98.5 | 161 |
| 20-40 | 98.3 | 152 |
| 40-60 | 97.6 | 131 |
| 60-80 | 97.6 | 129 |
| 80-100 | 97.2 | 120 |
| 100-120 | 97.0 | 116 |

This catalyst exhibits no initial increase in activity, and declines in activity at a somewhat greater rate than other selenium-stabilized catalysts. For this reason, it appears that the proportion of selenium actually introduced into the catalyst may have been somewhat less than the optimum.

Our improved catalyst is broadly useful in hydrocarbon-conversion reactions which are catalyzed by platinum. Specifically, our catalyst is useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art. Our catalyst is especially advantageous in the hydroforming of petroleum naphthas boiling in the range of about 200 to 400° F. Such naphthas are suitably contacted in the vapor phase with the catalyst at a temperature between about 800 to 1000° F., a pressure between about 10 and 1,000 pounds per square inch gage, an hourly weight space velocity between about 0.5 and 10, and a hydrogen recycle rate between about 2,000 and 10,000 standard cubic feet per barrel of charging stock. Under these conditions, our catalyst is capable of upgrading a 50 percent naphthenic naphtha having a CRF-R octane number of only 40 to 50 into a $C_{5+}$ gasoline having an octane number of 90 to 100 in a yield of 80 to 85 percent.

While we have described our invention with reference to certain specific embodiments thereof, it is to be understood that such embodiments are illustrative only and not by way of limitation. Numerous modifications and equivalents of our invention will be apparent from the foregoing description to those skilled in the art.

In accordance with the foregoing description, we claim as our invention:

1. A catalytic composition consisting essentially of between about 0.05 and 1 percent by weight of platinum, based on dry $Al_2O_3$, and between about 0.01 and 1 atom of selenium per atom of platinum, supported on alumina.

2. A catalytic composition consisting essentially of between about 0.05 and 1 percent by weight of platinum, based on dry $Al_2O_3$, and between about 0.05 and 0.5 atom of selenium per atom of platinum, supported on alumina.

3. A hydrocarbon conversion process which comprises contacting a hydrocarbon under conversion conditions with a catalyst consisting essentially of between about 0.05 and 1 percent by weight of platinum, based on dry $Al_2O_3$, and between about 0.01 and 1 atom of selenium per atom of platinum, supported on alumina.

4. A naphtha hydroforming process which comprises contacting a petroleum naphtha under hydroforming conditions with a catalyst consisting essentially of between about 0.05 and 1 percent by weight of platinum, based on dry $Al_2O_3$, and between about 0.01 and 1 atom of selenium per atom of platinum, supported on alumina.

5. A naphtha hydroforming process which comprises contacting a petroleum naphtha under hydroforming conditions with a catalyst consisting essentially of between about 0.05 and 1 percent by weight of platinum, based on dry $Al_2O_3$, and between about 0.05 and 0.5 atom of selenium per atom of platinum, supported on alumina.

6. In a hydroforming process wherein a petroleum naphtha is contacted under hydroforming conditions with a platinum-alumina catalyst and wherein said catalyst gradually decreases in activity through accumulation of carbon and through other physical and chemical changes, the improvement which comprises discontinuing said hydroforming operation after such catalyst deactivation, burning carbon therefrom, contacting said catalyst with a selenium-affording substance and depositing therein from about 0.01 to 1 atom of selenium per atom of platinum, and resuming said hydroforming operation, whereby said catalyst is reactivated and whereby the coking and deactivation rates thereof are substantially reduced.

7. In a process for hydroforming a sulfur-deficient petroleum naphtha under low-pressure conditions in the presence of a platinum-alumina catalyst wherein said naphtha affords a sulfur concentration, C, in the hydroforming zone less than about 350-P, expressed in parts per million, based on said naphtha, and wherein P is the hydroforming pressure between about 10 and 350 pounds per square inch gage, and wherein said catalyst tends to undergo rapid coking and deactivation, the improvement which comprises preconditioning said catalyst by contacting said catalyst with a selenium-containing substance under conditions adapted to incorporate from about 0.01 to 1 atom of selenium per atom of platinum in said catalyst, whereby the coking and deactivation rates thereof are substantially reduced.

8. A method for improving the stability of a platinum-alumina catalyst for the conversion of hydrocarbons, which comprises exposing said platinum-alumina catalyst to contact with a selenium-affording substance selected from the group consisting of selenium and selenium-containing compositions under conditions and for a time adapted to incorporate therein between about 0.01 and 1 atom of selenium per atom of platinum.

9. A method for improving the activity maintenance of a platinum-alumina catalyst for hydroforming petroleum naphthas, which comprises exposing said catalyst to contact with a selenium-containing vapor stream under conditions and for a time adapted to incorporate therein between about 0.01 and 1 atom of selenium per atom of platinum.

10. The process of claim 9 wherein said vapor stream contains hydrogen selenide.

11. A method for improving the stability of a platinum-alumina hydroforming catalyst, which comprises impregnating said catalyst with a selenium-containing solution in a quantity sufficient to incorporate selenium in said catalyst in an atomic ratio to platinum between about 0.01 and 1, and drying and calcining.

12. The process of claim 11 wherein said solution contains ammonium selenide.

13. A method for increasing the cycle length and average cycle activity of a platinum-alumina catalyst in a low-pressure hydroforming operation, which comprises impregnating said catalyst with an aqueous solution of a selenium compound in a quantity sufficient to incorporate selenium in said catalyst in an atomic ratio to platinum between about 0.05 and 0.5, and drying and calcining.

14. The process of claim 13 wherein said catalyst is impregnated with an aqueous solution of a selenium oxide.

15. A method for improving the activity maintenance of a platinum-alumina catalyst in a process for hydroforming a hydrodesulfurized naphtha at a pressure below about 350 pounds per square inch gage, which comprises impregnating said catalyst with an aqueous solution of ammonium selenide in a quantity sufficient to incorporate selenium in said catalyst in an atomic ratio to platinum between about 0.05 and 0.5, and drying and calcining.

16. A method for improving the activity maintenance of a platinum-alumina catalyst in a process for hydroforming a hydrodesulfurized naphtha at a pressure below about 350 pounds per square inch gage, which comprises impregnating said catalyst with an aqueous solution of selenium dioxide in a quantity sufficient to incorporate selenium in said catalyst in an atomic ratio to platinum between about 0.05 and 0.5, and drying and calcining.

References Cited in the file of this patent

UNITED STATES PATENTS

| 2,288,336 | Welty et al. | June 30, 1942 |
| 2,604,438 | Bannerot | July 22, 1952 |
| 2,659,692 | Haensel et al. | Nov. 17, 1953 |
| 2,700,013 | Oblad et al. | Jan. 18, 1955 |
| 2,736,684 | Tarnpoll | Feb. 28, 1956 |